United States Patent
Sethuraman et al.

(10) Patent No.: US 6,539,124 B2
(45) Date of Patent: *Mar. 25, 2003

(54) QUANTIZER SELECTION BASED ON REGION COMPLEXITIES DERIVED USING A RATE DISTORTION MODEL

(75) Inventors: Sriram Sethuraman, Hightstown, NJ (US); Ravi Krishnamurthy, Princeton, NJ (US)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,733

(22) Filed: Aug. 17, 1999

(65) Prior Publication Data

US 2002/0034245 A1 Mar. 21, 2002

Related U.S. Application Data

(60) Provisional application No. 60/118,359, filed on Feb. 3, 1999.

(51) Int. Cl.⁷ ................................................. G06K 9/36
(52) U.S. Cl. .................... 382/251; 382/236; 375/240.03
(58) Field of Search ............................... 382/251, 245, 382/236; 375/240.03, 240.24, 240; 348/433, 606, 405

(56) References Cited

U.S. PATENT DOCUMENTS

| | | | |
|---|---|---|---|
| 5,416,604 A | * 5/1995 | Park | 358/433 |
| 5,528,238 A | 6/1996 | Nickerson | |
| 5,532,940 A | 7/1996 | Agarwal et al. | |
| 5,539,662 A | * 7/1996 | Nikerson | 358/1.15 |
| 5,552,832 A | 9/1996 | Astle | |
| 5,802,213 A | * 9/1998 | Gardos | 382/239 |
| 5,920,356 A | * 7/1999 | Gupta et al. | 348/606 |
| 5,933,450 A | * 8/1999 | Ozkan et al. | 375/224 |
| 5,933,451 A | 8/1999 | Ozkan | |
| 6,008,848 A | * 12/1999 | Tiwari et al. | 349/270.03 |
| 6,023,296 A | * 2/2000 | Lee et al. | 375/270.24 |
| 6,094,455 A | * 7/2000 | Katta | 375/240 |

FOREIGN PATENT DOCUMENTS

| | | |
|---|---|---|
| WO | WO 99/03279 | 1/1999 |
| WO | WO99/04359 | 1/1999 |
| WO | WO 00/18131 | 3/2000 |
| WO | WO 00/46999 | 8/2000 |

* cited by examiner

Primary Examiner—Jingge Wu
(74) Attorney, Agent, or Firm—William J. Burke

(57) ABSTRACT

For video compression processing, each frame in a video sequence is segmented into one or more different regions, where the macroblocks of each region are to be encoded using the same quantizer value, but the quantizer value can vary between regions in a frame. For example, for the videophone or video-conferencing paradigm of one or more "talking heads" in front of a relatively static background, each frame is segmented into a foreground region corresponding to the talking head, a background region corresponding to the static background, and an intervening transition region. An encoding complexity measure is generated for each macroblock of the previous frame using a (e.g., first-order) rate distortion model and the resulting macroblock-level encoding complexities are used to generate an average encoding complexity for each region. These region complexities are then used to select quantizer values for each region in the current frame, e.g., iteratively until the target bit rate for the frame is satisfied to within a specified tolerance range. The selected quantizer values may be modified based on spatial and/or temporal constraints to satisfy spatial requirements of the video compression algorithm and/or to provide temporal smoothness in quality, respectively.

30 Claims, 1 Drawing Sheet

FIRST FRAME:

QUANTIZER SELECTION BASED ON REGION COMPLEXITIES DERIVED USING A RATE DISTORTION MODEL

CROSS-REFERENCE TO RELATED APPLICATIONS

This application claims the benefit of the filing date of U.S. provisional application Ser. No. 60/118,359, filed on Feb. 3, 1999.

BACKGROUND OF THE INVENTION

1. Field of the Invention

The present invention relates to image processing, and, in particular, to video compression.

2. Description of the Related Art

The goal of video compression processing is to encode image data to reduce the number of bits used to represent a sequence of video images while maintaining an acceptable level of quality in the decoded video sequence. This goal is particularly important in certain applications, such as videophone or video conferencing over POTS (plain old telephone service) or ISDN (integrated services digital network) lines, where the existence of limited transmission bandwidth requires careful control over the bit rate, that is, the number of bits used to encode each image in the video sequence. Furthermore, in order to satisfy the transmission and other processing requirements of a video conferencing system, it is often desirable to have a relatively steady flow of bits in the encoded video bitstream. That is, the variations in bit rate from image to image within a video sequence should be kept as low as practicable.

Achieving a relatively uniform bit rate can be very difficult, especially for video compression algorithms that encode different images within a video sequence using different compression techniques. Depending on the video compression algorithm, images may be designated as the following different types of frames for compression processing:

- An intra (I) frame which is encoded using only intra-frame compression techniques,
- A predicted (P) frame which is encoded using inter-frame compression techniques based on a previous I or P frame, and which can itself be used as a reference frame to encode one or more other frames,
- A bi-directional (B) frame which is encoded using bi-directional inter-frame compression techniques based on a previous I or P frame, a subsequent I or P frame, or a combination of both, and which cannot itself be used to encode another frame, and
- A PB frame which corresponds to two images—a P frame and a subsequent B frame—that are encoded as a single frame (as in the H.263 video compression algorithm). Depending on the actual image data to be encoded, these different types of frames typically require different numbers of bits to encode. For example, I frames typically require the greatest numbers of bits, while B frames typically require the least number of bits.

In a typical transform-based video compression algorithm, a block-based transform, such as a discrete cosine transform (DCT), is applied to blocks of image data corresponding either to pixel values or pixel differences generated, for example, based on a motion-compensated inter-frame differencing scheme. The resulting transform coefficients for each block are then quantized for subsequent encoding (e.g., run-length encoding followed by variable-length encoding). The degree to which the transform coefficients are quantized directly affects both the number of bits used to represent the image data and the quality of the resulting decoded image. This degree of quantization is also referred to as the quantization level, which is often represented by a specified quantizer value that is used to quantize all of the transform coefficients. In some video compression algorithms, the quantization level refers to a particular table of quantizer values that are used to quantize the different transform coefficients, where each transform coefficient has its own corresponding quantizer value in the table. In general, higher quantizer values imply more severe quantization and therefore fewer bits in the encoded bitstream at the cost of lower playback quality of the decoded images. As such, the quantizer is often used as the primary variable for controlling the tradeoff between bit rate and image quality.

Visual quality of video depends not only on global measures (like pixel signal-to-noise ratio (PSNR)), but also on how the error is distributed in space and time. Thus, it is important to maintain spatial smoothness of the quantizer (which is closely related to the local distortion) across the picture. In fact, in many scenes, the ideal quantizer selection is a uniform value across the scene. However, such a scheme will not support the moving of bits to a more-important region from less-important regions, and furthermore, will provide very little control over the bits used to encode the picture. Thus, it cannot be used in constant (or near-constant) bit-rate applications (like videophone and video-conferencing over POTS or ISDN).

The other possibility is to vary the quantizer from macroblock to macroblock within the constraints of the coding standard being used (for example, in H.263, the quantizer value can change by a value of at most 2 in either direction from one macroblock to the next when following a raster scan pattern through the image). Examples of such schemes are given in the H.263+TMN8 (Test Model Near-Term 8) and TMN9 documents (see, e.g., ITU— Telecommunications Standardization Sector, "Video Codec Test Model, Near-Term, Version 9 (TMN9)", Document Q15-C-15, December 1997). In these schemes, while the frame-level bit target can be accurately met, there are many, possibly large quantizer changes, both spatially and temporally, which show up annoyingly in the moving video as undesirable artifacts.

SUMMARY OF THE INVENTION

The present invention is directed to a technique for assigning quantization levels (e.g., quantizer values) used during video compression processing. According to the present invention, an image is segmented into one or more different regions, and a temporal prediction model is separately applied to each region to assign a quantization level to be used to quantize the transform coefficients for the macroblocks of that region. Because the temporal prediction model is applied separately to each region, a different quantization level may be—but does not have to be—assigned to each different region.

According to one embodiment, the present invention is a method for encoding a current frame in a video sequence, comprising the steps of (a) segmenting the current frame into one or more different regions; (b) generating an encoding complexity measure for each corresponding region of a previously encoded frame in the video sequence; (c) using the encoding complexity measure for each region of the previous frame to select a quantization level for the corresponding region of the current frame; and (d) encoding the current frame using the one or more selected quantization levels.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
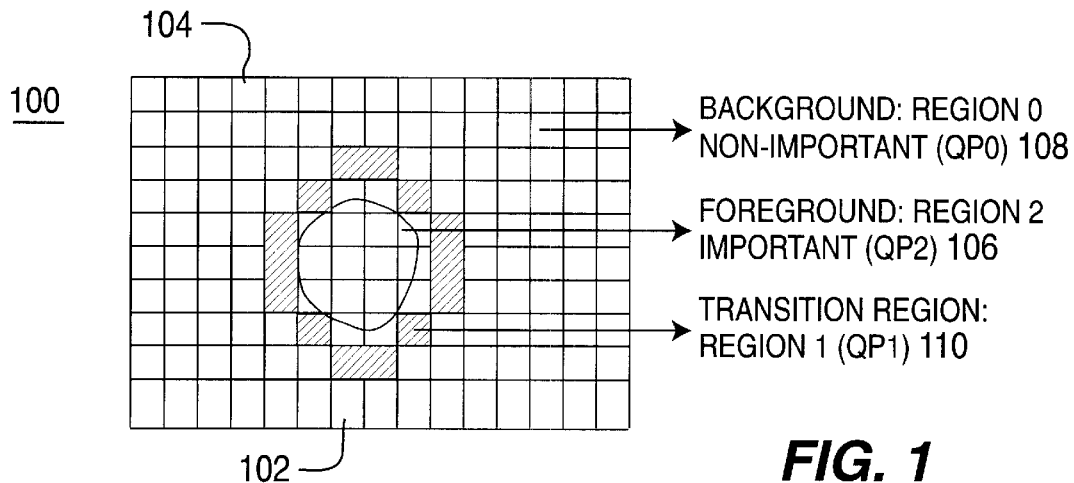
FIG. 1 shows an example of a typical image that can be encoded using the present invention.

FIG. 1 shows an example of a typical image 100 that can be encoded using the present invention. The image in FIG. 1 consists of the head and shoulders of a person 102 positioned in front of background imagery 104, where the image data corresponding to the head of person 102 varies more in time (i.e., from frame to frame) than the background imagery. Such a "talking head" scene is typical of videophone and video-conferencing applications. In general, during playback, the person in the foreground is of greater importance to the viewer of image 100 than is the background imagery. According to the present invention, image 100 is encoded such that, during playback, the video quality of the more-important foreground imagery is greater than the video quality of the less-important background imagery. This variation in playback video quality within an image is achieved by allowing the quantizers used during the video compression processing to encode the macroblocks of image 100 to vary within the image. According to the present invention, the selection of quantizers follows a particular scheme, described as follows.

As shown in FIG. 1, image 100 is divided into three different regions: a foreground region 106 (also referred to as the most-important region) consisting of those macroblocks corresponding to the head of person 102, a background region 108 (also referred to as the least-important region) consisting of macroblocks corresponding to background imagery 104 (including, in this particular example, the shoulders of person 102), and a transition region 110 consisting of macroblocks located between the foreground region and the background region. According to the present invention, all of the macroblocks corresponding to the foreground region 106 are encoded using the same quantizer QP2, all of the macroblocks corresponding to the background region 108 are encoded using the same quantizer QP0, and all of the macroblocks corresponding to the transition region 110 are encoded using the same quantizer QP1, where, typically, QP0>=QP1>=QP2. As such, the most-important, foreground region 106 is typically encoded using more bits per macroblock than the transition region 110, which in turn is typically encoded using more bits per macroblock than the least-important, background region 108. As a result, the foreground region 106 will typically have the highest quality and the background region 108 will typically have the lowest quality during playback of the decoded image data, as is usually desired for applications such as videophone and video-conferencing.

Figure 2:
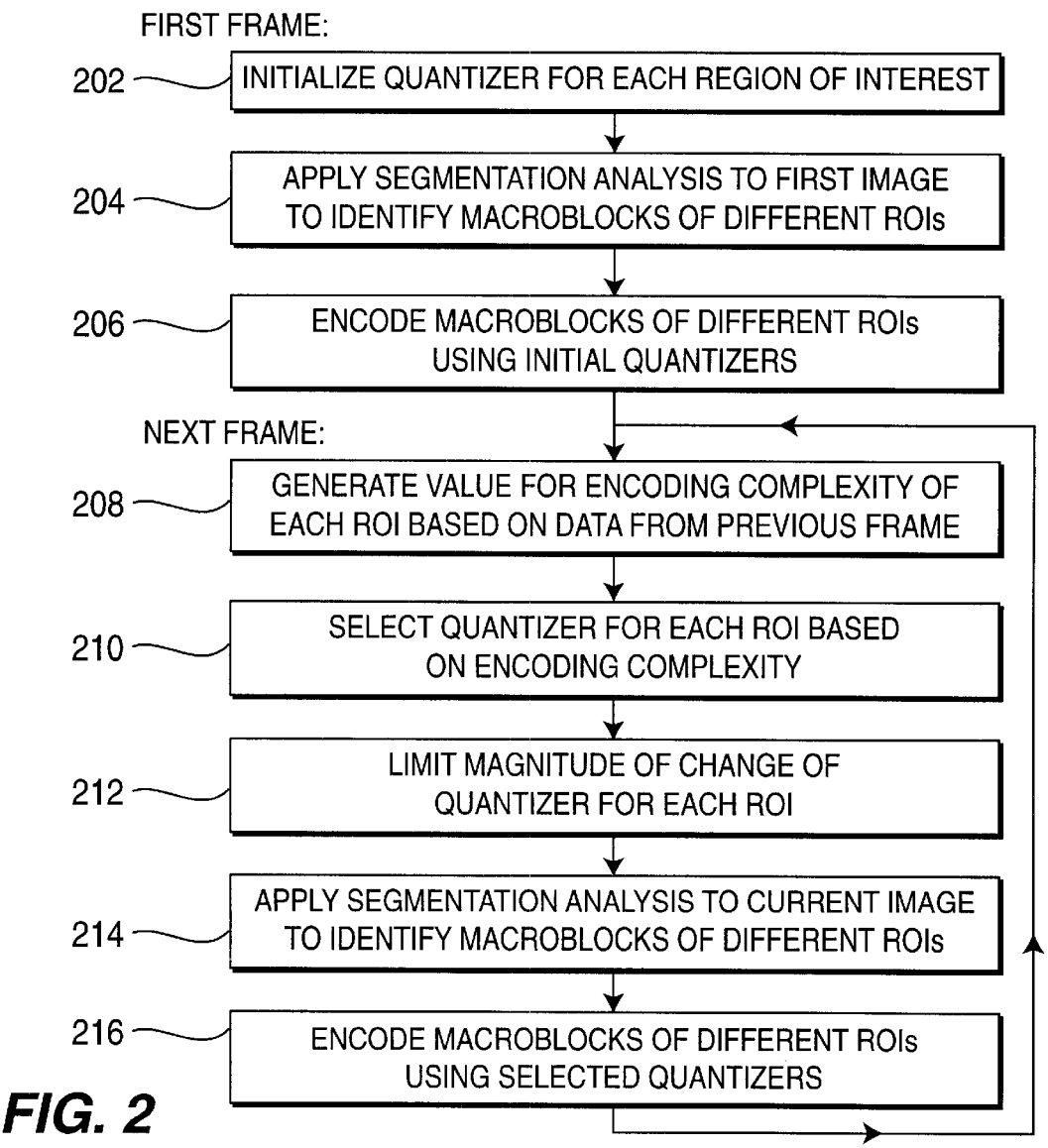
FIG. 2 shows a flow diagram of the processing involved in applying a temporal prediction model during video compression processing, according to one embodiment of the present invention.

FIG. 2 shows a flow diagram of the processing involved in applying a temporal prediction model during video compression processing, according to one embodiment of the present invention. Depending on the application, the processing of FIG. 2 may be applied to a video compression scheme that segments each image into three regions, such as those shown in FIG. 1. In general, however, the processing of FIG. 2 may be applied in video compression schemes that segment images into any number of regions, including those that treat each image as a single region. For the following discussion, the processing of FIG. 2 will be assumed to be for a video compression scheme that is based on the three regions of FIG. 1.

Processing begins by initializing the quantizer values for the three regions (step 202 of FIG. 2). Depending on the particular implementation, the quantizers for all three regions may be initialized to the same value, for example, conservatively selecting a high (or even the highest possible) quantizer value to ensure initial compliance with target bit rates. Alternatively, the most-important region (i.e., foreground region 106 in FIG. 1) may be assigned a relatively low quantizer value (corresponding to less-severe quantization) and the least-important region (i.e., background region 108) may be assigned a relatively high quantizer value (corresponding to more-severe quantization) to initialize processing at more desirable quantization levels. In some video compression algorithms, the magnitude of the difference in quantizers between successive macroblocks (e.g., following a raster scan pattern through the image) may be limited, e.g., ±2, as in the H.263 video compression standard. In such applications, this constraint is taken into account during the initialization of quantizer values.

After initializing the quantizer values, segmentation analysis is applied to the first image (i.e., frame) in the video sequence to identify the three subsets of macroblocks corresponding to the foreground, background, and transition regions, respectively (step 204). Any suitable type of segmentation analysis may be used. Depending on the segmentation analysis employed and the characteristics of the video imagery, each of the three subsets of macroblocks may, but need not correspond to a contiguous set of macroblocks in the image. For example, in a video-conferencing application in which two "talking heads" appear in the image corresponding to two different individuals, the foreground region may consist of two different contiguous sets of macroblocks, each corresponding to the face of a different video-conference participant. Moreover, the general principle of the segmentation scheme of FIG. 1 is that at least one macroblock of the transition region be located between a macroblock of the foreground region and a macroblock of the background region when following a raster scan pattern through the image. As such, the transition region for a particular image may be made up of a relatively large number of non-contiguous sets of macroblocks, as in transition region 110 of FIG. 1 (where sets of macroblocks touching at only a single corner are not considered to be contiguous).

After the first image has been segmented into three sets of macroblocks corresponding to the three regions, the first image is encoded, where the transform coefficients for all of the macroblocks of each region are quantized using the particular quantizer value selected for that region (step 206). This encoding may, but does not have to, involve the selection of alternative quantizer values and the requantization of the transform coefficients, if and when the target bit rate is not met for the frame using the initial selection of quantizers. After the first image is encoded, processing continues to steps 208–216, which are applied sequentially to each of the remaining images in the scene. The processing preferably starts all over again at a scene change from step 202. For an I frame introduced in the middle of a scene, the I frame is encoded using a uniform quantizer which is the average quantizer from the preceding P frame, and no model updates are done. The subsequent P frame uses the model update from the last P frame and processing proceeds. It is as if the I frame did not exist for the purpose of choosing and constraining quantizers for the subsequent P frame.

In step 208, data from the previous frame is used to generate a value for the encoding complexity measure X of each macroblock in the previous frame using Equation (1) as follows:

$$X=(R-H)*Q/(S-CQ) \quad (1)$$

where R is the number of bits used to encode the macroblock, H is the number of header bits (including motion vector coding bits) used to encode the macroblock, Q is the quantizer level used to encode the macroblock, S is a measure of the distortion of the macroblock, and C is a specifiable constant (e.g., preferably 2.5). The distortion measure S may be any suitable measure of the distortion of the macroblock. For inter-frame encoded data, one possible distortion measure is based on the sum of the absolute differences (SAD) of the inter-frame pixel difference data for the macroblock. For intra-frame encoded data, one possible distortion measure is based on the SAD between the individual pixel values and the mean pixel value for the corresponding block or macroblock. In either case, in Equation (1), the distortion measure S is the average SAD per pixel in the macroblock, translated to the DCT domain. In many cases, the DCT coefficients (before quantization) have a different dynamic range from the original pixel data due to a scaling factor (which is generally 8). Until S reaches a certain threshold, the block will quantize to zero (i.e., none of the coefficients will be significant). This threshold is modeled as 2.5Q, since the actual quantization step size is 2Q, with the rounding used by H.263. This means that S has to be greater than 2.5Q for it to yield at least one non-zero quantized coefficient. Note that this thresholding can be avoided by setting C to 0.

For each region, the encoding complexity values X for the different macroblocks in the region are averaged to generate an average encoding complexity Xave for each region in the previous frame. The previous frame refers to the previously encoded frame. For bi-directionally encoded frames, each complexity value X is derived as an average of the corresponding regions of the forward and backward reference frames.

The average encoding complexity Xave for each region is then used to determine a quantizer value to be used to encode the macroblocks of the corresponding region in the current frame (step 210), using Equation (2) as follows:

$$(R-H)=\max\{Xave*(Save-CQ)/Q, 0\} \quad (2)$$

where (R–H) corresponds to the target number of bits for encoding each macroblock of the corresponding region of the current frame, Xave is the average encoding complexity for the corresponding region of the previous frame generated using Equation (1), Save is the average distortion measure for the corresponding region of the current frame, and Q is the quantizer value for the corresponding region of the previous frame. The number of header bits (H) is the sum of Hmb (the number of bits in the macroblock mode headers for the previous frame) and Hmv (the number of bits for the motion vectors for the current frame). Any of the parameters that are based on the previous frame (i.e., Xave, Q, and/or Hmb) may be derived from more than just the one previous frame. Equation (2) is applied to different quantizer values in an iterative manner until the frame target bit rate is satisfied to within a specified tolerance range. This can be done iteratively for each region while assuming the maximum difference between quantizer values for different regions allowable under the compression algorithm. Note that the first P frame does not have a history and the average encoding complexities for the previous frame (Xave) are not available. In this case, a "fall-back" mode is preferably used to adapt the quantizers over the frame to meet the target. At that point, the actual bits used for each macroblock within a region are used to initialize the region complexity.

After a quantizer value is selected for each region in the current frame using Equation (2), the quantizer values are adjusted if necessary for both spatial and temporal considerations (step 212). Spatially, the quantizer values generated using Equation (2) may need to be adjusted to ensure that the magnitude of change in quantizer value from one macroblock in one region to the next macroblock in a different region does not exceed the limit, if one exists, imposed by the video compression algorithm. Temporally, the magnitude of change in quantizer values from one region in one frame to the corresponding region in the next frame as generated using Equation (2) is preferably limited to ensure temporal smoothness in quality. For example, the temporal variation of the quantizer for each region may be constrained to 15% of Q when the quantizer value is reduced and to 60% of Q when the quantizer value is increased, where Q can vary from 1 to 31. As a particular example, if the quantizer value for an region in the previous frame was 16, then the quantizer value for the corresponding region in the current frame cannot be less than Q-15%Q=16-(0.15)(16)=13.6 or greater than Q+60%Q=16+(0.60)16=25.6.

After adjusting the quantizer values, segmentation analysis is applied to the current image to identify the three subsets of macroblocks corresponding to the foreground, background, and transition regions, respectively (step 214). After the current image has been segmented into three sets of macroblocks corresponding to the three regions, the current image is encoded, where the transform coefficients for all of the macroblocks of each region are quantized using the particular quantizer value selected for that region (step 216). The processing of steps 214 and 216 for the current image is analogous to the processing of steps 202 and 204 for the first image.

In the embodiment described in conjunction with FIG. 2, the temporal prediction model of Equations (1) and (2) is based on a first-order rate distortion model. In alternative embodiments, higher-order models, such as a closed-form solution for a quadratic rate distortion model, may be used.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding a current frame in a video sequence, comprising the steps of:
    (a) segmenting the current frame into one or more different regions;
    (b) generating an encoding complexity measure for each corresponding region of a previously encoded frame in the video sequence;
    (c) using the encoding complexity measure for each region of the previous frame to select a quantization level for the corresponding region of the current frame;
    (d) applying a temporal constraint to modify the selected quantization level for at least one region of the current frame, wherein the temporal constraint imposes an absolute upper limit on magnitude of change in quantization level from one region in the previous frame to the corresponding region in the current frame; and
    (e) encoding the current frame using the one or more modified quantization levels, wherein:
        the temporal constraint when quantization level is increasing from the previous frame to the current frame is different from the temporal constraint when quantization level is decreasing from the previous frame to the current frame; and
        the temporal constraint allows greater percentage increases in quantization level than percentage decreases from the previous frame to the current frame.

2. The invention of claim 1, wherein the current frame is segmented into a plurality of regions.

3. The invention of claim 2, wherein the current frame is segmented into a foreground region, a background region, and a transition region, wherein at least one macroblock in the transition region is between each macroblock in the foreground region and each macroblock in the background region following a raster scan pattern through the current frame.

4. The invention of claim 1, wherein, for each region in the current frame, the quantization level is identical for all macroblocks.

5. The invention of claim 1, wherein the encoding complexity measure is based on a first-order temporal prediction model.

6. The invention of claim 1, wherein the encoding complexity measure for each region in the previous frame is generated based on:

$$X=(R-H)*Q/S$$

wherein X is an encoding complexity measure for a macroblock in the previous frame, R is a number of bits used to encode the macroblock, H is a number of header bits used to encode the macroblock, Q is a quantizer level used to encode the macroblock, and S is a measure of distortion of the macroblock.

7. The invention of claim 6, wherein the distortion measure S is based on a sum of absolute differences (SAD) measure.

8. The invention of claim 6, wherein the encoding complexity measure for each region in the previous frame is generated by averaging the encoding complexity measure X for all of the macroblocks in the region.

9. The invention of claim 1, wherein the encoding complexity measure for each region in the previous frame is generated based on:

$$X=(R-H)*Q/(S-CQ)$$

wherein X is an encoding complexity measure for a macroblock in the previous frame, R is a number of bits used to encode the macroblock, H is a number of header bits used to encode the macroblock, Q is a quantizer level used to encode the macroblock, S is a measure of distortion of the macroblock, and C is a constant.

10. The invention of claim 9, wherein:
    the distortion measure S is based on a sum of absolute differences (SAD) measure; and the constant C is about 2.5.

11. The invention of claim 9, wherein the encoding complexity measure for each region in the previous frame is generated by averaging the encoding complexity measure X for all of the macroblocks in the region.

12. The invention of claim 1, wherein step (c) comprises the step of iteratively selecting one or more different quantization levels for each region until a frame target bit rate is satisfied to within a specified tolerance range according to:

$$(R-H)=\max\{Xave*(S-CQ)/Q, 0\}$$

wherein (R–H) corresponds to a target number of bits for encoding each macroblock of the corresponding region of the current frame, Xave is an average encoding complexity for the corresponding region of the previous frame, S is an average distortion measure for the corresponding region of the current frame, and Q is a quantizer value for the corresponding region of the current frame.

13. The invention of claim 1, wherein a spatial constraint is applied to ensure that a magnitude of change in quantization level from one macroblock to a next macroblock in the current frame following a raster scan pattern is not greater than a specified maximum spatial change in quantization level.

14. The invention of claim 3, wherein:
    the quantization level selected for the foreground region is constrained to be less than or equal to the quantization level selected for the transition region; and
    the quantization level selected for the transition region is constrained to be less than or equal to the quantization level selected for the background region.

15. A machine-readable medium having encoded thereon program code, wherein, when the program code is executed by a machine, the machine implements the steps of:
    (a) segmenting the current frame into one or more different regions;
    (b) generating an encoding complexity measure for each corresponding region of a previously encoded frame in the video sequence;
    (c) using the encoding complexity measure for each region of the previous frame to select a quantization level for the corresponding region of the current frame;
    (d) applying a temporal constraint to modify the selected quantization level for at least one region of the current flame, wherein the temporal constraint imposes an absolute upper limit on magnitude of change in quantization level from one region in the previous frame to the corresponding region in the current frame; and
    (e) encoding the current frame using the one or more modified quantization levels, wherein:
        the temporal constraint when quantization level is increasing from the previous frame to the current frame is different from the temporal constraint when quantization level is decreasing from the previous from to the current frame; and the temporal constraint allows greater percentage increases in quantization level than percentage decreases from the previous frame to the current frame.

16. A method for encoding a current frame in a video sequence, comprising the steps of:

(a) segmenting the current frame into one or more different regions;

(b) generating an encoding complexity measure for each corresponding region of a previously encoded frame in the video sequence;

(c) using the encoding complexity measure for each region of the previous frame to select a quantization level for the corresponding region of the current frame; and (d) encoding the current frame using the one or more selected quantization levels, wherein the encoding complexity measure for each region in the previous frame is generated based on:

$$X=(R-H)*Q/S$$

wherein X is an encoding complexity measure for a macroblock in the previous frame, R is a number of bits used to encode the macroblock, H is a number of header bits used to encode the macroblock, Q is a quantizer level used to encode the macroblock, and S is a measure of distortion of the macroblock.

17. The invention of claim 16, wherein the distortion measure S is based on a sum of absolute differences (SAD) measure.

18. The invention of claim 16, wherein the encoding complexity measure for each region in the previous frame is generated by averaging the encoding complexity measure X for all of the macroblocks in the region.

19. A method for encoding a current frame in a video sequence, comprising the steps of:

(a) segmenting the current frame into one or more different regions;

(b) generating an encoding complexity measure for each corresponding region of a previously encoded frame in the video sequence;

(c) using the encoding complexity measure for each region of the previous frame to select a quantization level for the corresponding region of the current frame; and (d) encoding the current frame using the one or more selected quantization levels, wherein the encoding complexity measure for each region in the previous frame is generated based on:

$$X=(R-H)*Q/(S-CQ)$$

wherein X is an encoding complexity measure for a macroblock in the previous frame, R is a number of bits used to encode the macroblock, H is a number of header bits used to encode the macroblock, Q is a quantizer level used to encode the macroblock, S is a measure of distortion of the macroblock, and C is a constant.

20. The invention of claim 19, wherein:

the distortion measure S is based on a sum of absolute differences (SAD) measure; and the constant C is about 2.5.

21. The invention of claim 19, wherein the encoding complexity measure for each region in the previous frame is generated by averaging the encoding complexity measure X for all of the macroblocks in the region.

22. A method for encoding a current frame in a video sequence, comprising the steps of:

(a) segmenting the current frame into one or more different regions;

(b) generating an encoding complexity measure for each corresponding region of a previously encoded frame in the video sequence;

(c) using the encoding complexity measure for each region of the previous frame to select a quantization level for the corresponding region of the current frame; and (d) encoding the current frame using the one or more selected quantization levels, wherein step (c) comprises the step of iteratively selecting one or more different quantization levels for each region until a frame target bit rate is satisfied to within a specified tolerance range according to:

$$(R-H)=\max\{Xave*(S-CQ)/Q, 0\}$$

wherein (R–H) corresponds to a target number of bits for encoding each macroblock of the corresponding region of the current frame, Xave is an average encoding complexity for the corresponding region of the previous frame, S is an average distortion measure for the corresponding region of the current frame, and Q is a quantizer value for the corresponding region of the current frame.

23. The invention of claim 15, wherein the current frame is segmented into a foreground region, a background region, and a transition region, wherein at least one macroblock in the transition region is between each macroblock in the foreground region and each macroblock in the background region following a raster scan pattern through the current frame.

24. The invention of claim 23, wherein:

the quantization level selected for the foreground region is constrained to be less than or equal to the quantization level selected for the transition region; and the quantization level selected for the transition region is constrained to be less than or equal to the quantization level selected for the background region.

25. The invention of claim 15, wherein the encoding complexity measure is based on a first-order temporal prediction model.

26. The invention of claim 15, wherein the encoding complexity measure for each region in the previous frame is generated based on:

$$X=(R-H)*Q/S$$

wherein X is an encoding complexity measure for a macroblock in the previous frame, R is a number of bits used to encode the macroblock, H is a number of header bits used to encode the macroblock, Q is a quantizer level used to encode the macroblock, and S is a measure of distortion of the macroblock.

27. The invention of claim 15, wherein the encoding complexity measure for each region in the previous frame is generated based on:

$$X=(R-H)*Q/(S-CQ)$$

wherein X is an encoding complexity measure for a macroblock in the previous frame, R is a number of bits used to encode the macroblock, H is a number of header bits used to encode the macroblock, Q is a quantizer level used to encode the macroblock, S is a measure of distortion of the macroblock, and C is a constant.

28. The invention of claim 15, wherein step (c) comprises the step of iteratively selecting one or more different quantization levels for each region until a frame target bit rate is satisfied to within a specified tolerance range according to:

$$(R-H) = \max\{X_{ave} * (S-CQ)/Q, 0\}$$

wherein (R–H) corresponds to a target number of bits for encoding each macroblock of the corresponding region of the current frame, Xave is an average encoding complexity for the corresponding region of the previous frame, S is an average distortion measure for the corresponding region of the current frame, and Q is a quantizer value for the corresponding region of the current frame.

29. The invention of claim 15, wherein a spatial constraint is applied to ensure that a magnitude of change in quantization level from one macroblock to a next macroblock following a raster scan pattern is not greater than a specified maximum spatial change in quantization level.

30. A method for encoding a current frame in a video sequence, comprising the steps of:

(a) segmenting the current frame into one or more different regions;

(b) generating an encoding complexity measure for each corresponding region of a previously encoded frame in the video sequence;

(c) using the encoding complexity measure for each region of the previous frame to select a quantization level for the corresponding region of the current frame;

(d) applying a temporal constraint to modify the selected quantization level for at least one region of the current frame, wherein:

the temporal constraint limits magnitude of change in quantization level from one region in the previous frame to the corresponding region in the current frame; and the temporal constraint allows greater percentage increases in quantization level than percentage decreases from the previous frame to the current frame; and (e) encoding the current frame using the one or more modified quantization levels.

* * * * *

UNITED STATES PATENT AND TRADEMARK OFFICE
CERTIFICATE OF CORRECTION

PATENT NO. : 6,539,124 B2
DATED : March 25, 2003
INVENTOR(S) : Sriram Sethuraman and Ravi Krishnamurthy It is certified that error appears in the above-identified patent and that said Letters Patent is hereby corrected as shown below:

Title page,
Item [56], References Cited, U.S. PATENT DOCUMENTS, add:
-- 6,243,497   6/2001   Chiang et al.   382/251
   6,229,925   5/2001   Alexandre et al.   382/239 --.

Signed and Sealed this

Twenty-fifth Day of January, 2005

JON W. DUDAS
*Director of the United States Patent and Trademark Office*